US010789087B2

(12) United States Patent
Bharde et al.

(10) Patent No.: US 10,789,087 B2
(45) Date of Patent: Sep. 29, 2020

(54) INSIGHT USAGE ACROSS COMPUTING NODES RUNNING CONTAINERIZED ANALYTICS

(71) Applicant: HEWLETT PACKARD ENTERPRISE DEVELOPMENT LP, Houston, TX (US)

(72) Inventors: Madhumita Sunil Bharde, Bangalore (IN); Suparna Bhattacharya, Bangalore (IN); Priya Pappanaickenpalayam Muthuswamy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 190 days.

(21) Appl. No.: 15/995,056

(22) Filed: May 31, 2018

(65) Prior Publication Data
US 2019/0370046 A1  Dec. 5, 2019

(51) Int. Cl.
G06F 9/455 (2018.01)
G06F 11/30 (2006.01)
G06K 9/62 (2006.01)

(52) U.S. Cl.
CPC ........ G06F 9/45558 (2013.01); G06F 11/302 (2013.01); G06K 9/6215 (2013.01); G06F 2009/45562 (2013.01); G06F 2009/45579 (2013.01); G06F 2009/45591 (2013.01); G06F 2009/45595 (2013.01)

(58) Field of Classification Search
CPC ............. G06F 11/3447; G06F 11/3476; G06F 3/0629; G06F 3/067; G06F 3/0683
See application file for complete search history.

(56) References Cited

U.S. PATENT DOCUMENTS 7,970,892 B2 * 6/2011 Sedukhin ............ G06F 11/3447
709/220
2013/0262425 A1 * 10/2013 Shamlin ................ G06F 16/256
707/703

(Continued)

FOREIGN PATENT DOCUMENTS

WO    2016/069031 A1    5/2016

OTHER PUBLICATIONS

Anand Chintamaneni, "Big Data Analytics in a Hybrid Cloud Environment", available online at <https://www.bluedata.com/blog/2017/03/big-data-analytics-hybrid-cloud/>, Mar. 7, 2017, 9 pages.

(Continued)

Primary Examiner — Dong U Kim
(74) Attorney, Agent, or Firm — Hewlett Packard Enterprise Patent Department

(57) ABSTRACT

In an example, a distributed data access system compares a first lineage of a first analytics application with a second lineage of a second analytics application. The first analytics application may be run in a first container hosted by a first computing node and the second analytics application may run in a second container hosted by a second computing node. Based on the comparison, the distributed data access system determines whether a first insight generated by the first analytics application can be used in a processing of the second analytics application.

15 Claims, 9 Drawing Sheets

(56) References Cited

U.S. PATENT DOCUMENTS

| | | | |
|---|---|---|---|
| 2014/0188918 A1* | 7/2014 | Shamlin | G06F 16/2465 707/756 |
| 2015/0331635 A1* | 11/2015 | Ben-Shaul | G06F 9/5061 711/120 |
| 2017/0264684 A1 | 9/2017 | Spillane et al. | |
| 2017/0300561 A1 | 10/2017 | Kannan et al. | |
| 2018/0024853 A1* | 1/2018 | Warfield | G06F 9/45558 718/1 |
| 2018/0060740 A1* | 3/2018 | Bradley | G06N 5/025 |
| 2018/0069933 A1* | 3/2018 | Chandra | H04N 5/23238 |
| 2018/0096079 A1 | 4/2018 | Voigt et al. | |
| 2018/0096080 A1 | 4/2018 | Voigt et al. | |
| 2018/0096081 A1 | 4/2018 | Voigt et al. | |
| 2018/0217883 A1 | 8/2018 | Murugan et al. | |
| 2019/0121889 A1* | 4/2019 | Gold | G06F 16/2255 |

OTHER PUBLICATIONS

Andrea Corry, "Robin Systems announces extension of Hybrid Cloud support to Microsoft Azure as well as for SAP HANA, MS-SQL, IBM DB2 & Packaged Enterprise Applications", available online at <https://robin.io/press/application-detined-infrastructure-hybrid-cloud/>, Mar. 6, 2018, 7 pages.

Bluedata, "Instant Hadoop and Spark Clusters", available online at <https://web.archive.org/web/20180524000126/https://www.bluedata.com/product/>, May 24, 2018, 6 pages.

Iguazio, "A Redesigned Data Stack", available online at <https://web.archive.org/web/20171105233532/https://www.iguazio.com/product/architecture/>, Nov. 5, 2017, 6 pages.

Robin Cloud Platform (RCP), "Deploy, Manage, Consolidate: Big-Data, NoSQL, Enterprise DBs", available online at <https://www.ibm.com/us-en/marketplace/8082>, Retrieved online on Oct. 17, 2019, 4 pages.

Robin, "Robin Storage—Advanced Data Management for Kubernetes", Retrieved on Oct. 17, 2019, 2 pages.

Sean Roth, "Red Hat OpenShift + Diamanti: Fast Tracking Containers to Production", available online at <https://diamanti.com/main-blog/red-hat-openshift-diamanti-fast-tracking-containers-to-production/>, May 4, 2018, 4 pages.

Susan Hall, "Pachyderm Challenges Hadoop with Containerized Data Lakes", available online at <https://thenewstack.io/pachyderm-aims-displace-hadoop-container-based-collaborative-data-analysis-plafform/>, May 10, 2016, 12 pages.

William Benton, "Containerized Spark on Kubernetes", Spark Summit Europe, 2016, 133 pages.

Chen Yang, "Checkpoint and Restoration of Micro-service in Docker Containers," 3rd International Conference on Mechatronics and Industrial Informatics, 2015, pp. 1-4, School of Information Security Engineering, Shanghai Jiao Tong University, China.

Jim Bugwadia, "Containerizing Stateful Applications," Jun. 12, 2016, pp. 1-7 [online], InfoWorld, Retrieved from the Internet on Mar. 1, 2018 at URL: <infoworld.com/article/3106416/cloud-cornputing/containerizing-stateful-applications.html>.

Shripad Nadgowda et al., "Voyager: Complete Container State Migration," 37th Internationai Conference on Distributed Computing Systems, 2017, pp. 1-6, IEEE.

* cited by examiner

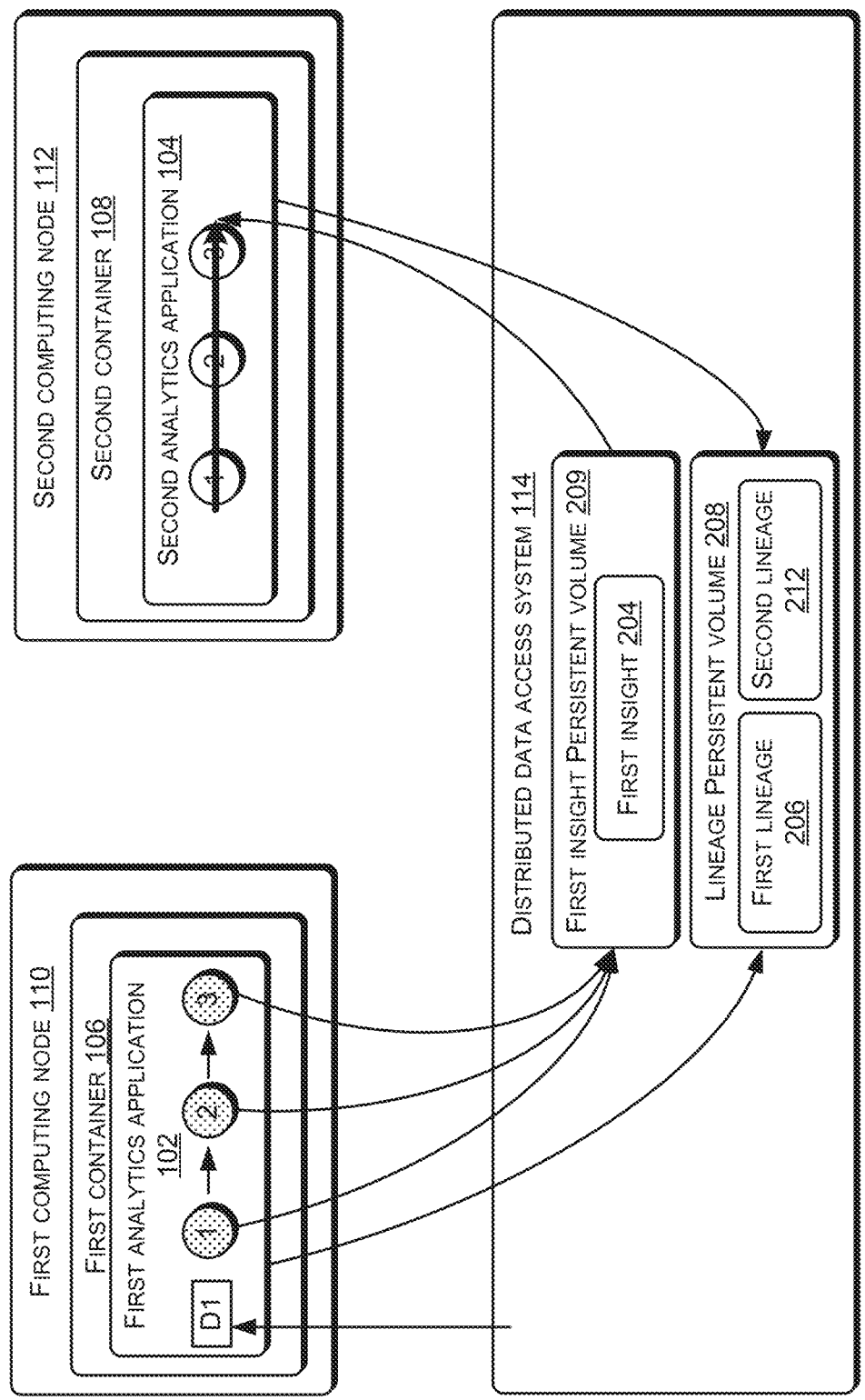

INSIGHT USAGE ACROSS COMPUTING NODES RUNNING CONTAINERIZED ANALYTICS

BACKGROUND

Analytics applications are applications used to process data to derive meaningful insights out of the data. For example, analytics applications may be used to process sales data, customer data, transactional data, and employee data of an organization to derive insights regarding performance of the organization. An analytics application may be run in a container, which is an environment that can isolate the analytics application from a computing device it is hosted on and from other applications running on the computing device. The container may provide, among other things, code, runtime, system tools, system libraries, and settings to the analytics applications.

BRIEF DESCRIPTION OF DRAWINGS

The following detailed description references the figures, wherein:

FIG. 3(a) illustrates reuse of insights across different containers, according to an example implementation of the present subject matter.

DETAILED DESCRIPTION

Figure 1:
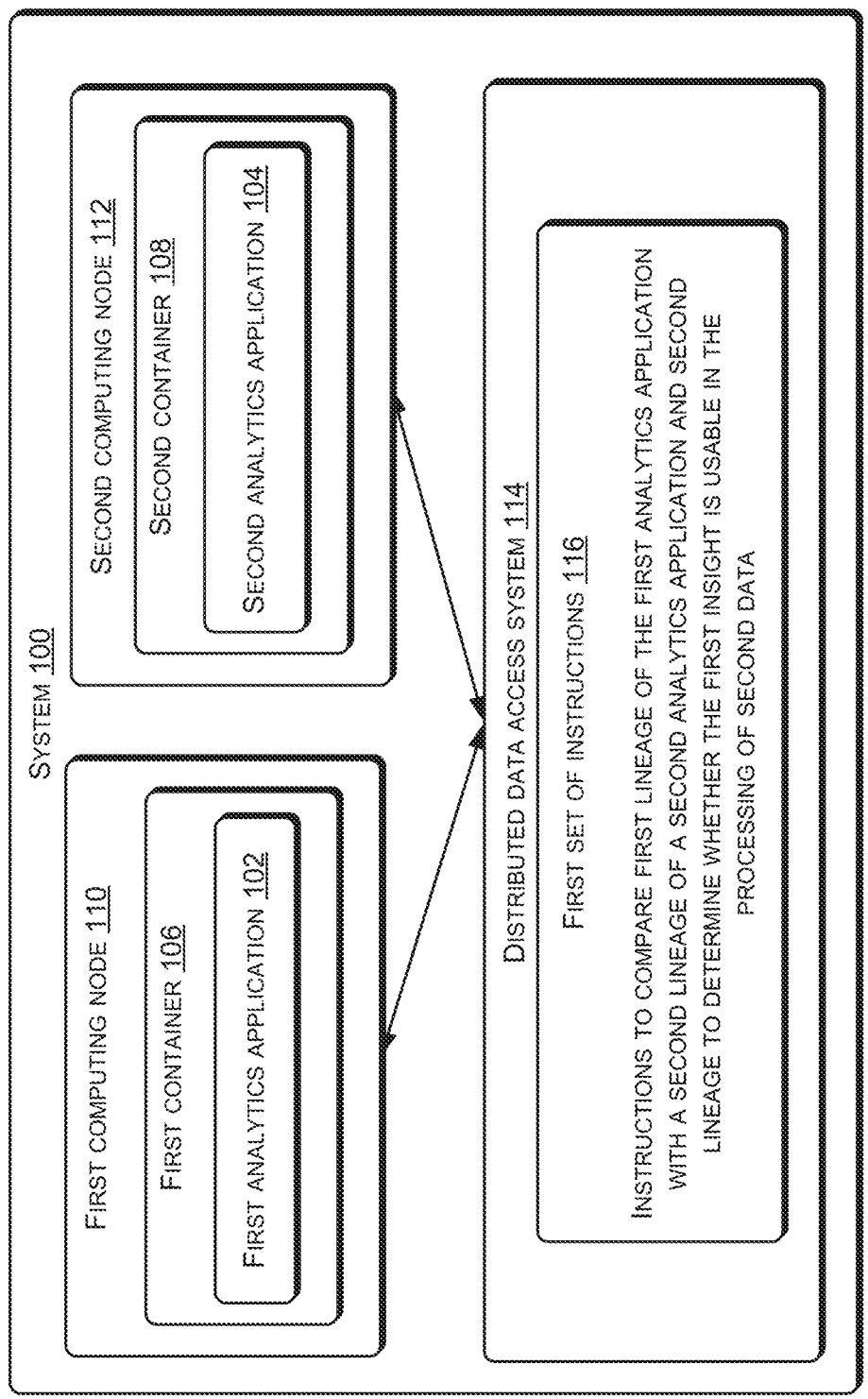
FIG. 1 illustrates a system to allow usage of insights generated by a first analytics application in a processing performed by a second analytics application, according to an example implementation of the present subject matter.

Analytics applications may be run in containers to provide a consistent runtime environment to the analytics applications regardless of computing nodes on which the analytics applications are hosted. Further, running analytics applications in containers allows for easy mobility of the analytics applications across computing nodes. Analytics applications running in containers may be referred to as containerized analytics applications. Containerized analytics applications are generally used in public, private, or hybrid cloud environments that provide Big-Data-as-a-Service (BDaaS) solutions.

At times, a container running an analytics application may be moved from a first computing node to a second computing node due to various reasons, such as load balancing or failure of the first computing node. In such cases, any operation performed by the analytics application in the first computing node may be lost, and may have to be repeated in the second computing node.

Also, in some cases, an analytics environment may span several clusters of computing nodes, also referred to as analytics clusters. In such cases, data to be analyzed may be ingested in a storage of a first analytics cluster, but may have to be processed in a second analytics cluster. Therefore, the ingested data is to be shared from the storage of the first analytics cluster to a storage of the second analytics cluster. This may lead to high data transfer costs and network traffic.

To avoid the movement of data, in some cases, an analytics application may be deployed in an analytics cluster that has the data to be analyzed. Thus, it may not be possible to deploy an analytics application in a different analytics cluster that may be more suited to handle the analytics application.

The present subject matter relates to usage of insights across computing nodes running containerized analytics. With the implementations of the present subject matter, data processing by analytics applications running in containers can be made more efficient and faster.

In accordance with an example implementation, a first analytics application is run in a first container hosted by a first computing node. The first analytics application is to process first data to generate a first insight. Also, a second analytics application runs on a second container hosted by a second computing node. The second analytics application is to process second data.

A distributed data access system receives a first lineage of the first analytics application. The first lineage includes information of the first data and a workflow used by the first analytics application to obtain the first insight. In addition to the first lineage, the distributed data access system receives a second lineage of the second analytics application. Based on a comparison of the first lineage and the second lineage, a determination is made whether the first insight can be used in the processing of the second data.

The present subject matter provides techniques to increase speed of processing of data by containerized analytics applications. For instance, usage of already-generated insights in the processing by an analytics application significantly reduces the time consumed for the processing. Also, making insights and lineages available for several containers across different computing nodes improves overall effectiveness of analytics applications running in containerized environments. For example, when a container is moved from a first computing node to a second computing node, the processing performed by an analytics application in the container in the first computing node can be reused in the second computing node, rather than repeating the previously-performed processing. Further, such a reuse of previously-performed processing may be performed without the analytics application having to checkpoint its progress. Thus, the burden on the analytics applications may be reduced or eliminated. Still further, in some cases, the insights generated in one analytics cluster may be reused in other analytic clusters. This reduces the amount of raw data to be moved across analytics clusters. This also increases the flexibility of deployment of analytics applications in any analytics clusters. Overall, the present subject matter facilitates seamless mobility of analytics applications and data across computing nodes and across analytics clusters with minimal expenditure of computational and network resources.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 to allow usage of insights generated by a first analytics application 102 in a processing performed by a second analytics application 104, according to an example implementation of the present subject matter. The terms usage of insights, reuse of insights, and utilization of insights may be used interchangeably in the following description. The system 100 may be implemented as any of a variety of computing systems, such as a desktop computer, a laptop computer, a server, and the like. In an example, the system 100 may include a plurality of computing nodes, as will be explained subsequently.

An analytics application may be defined as an application that is used to process a raw data and to generate meaningful insights out of the raw data. The terms generation of insights, deriving insights, and obtaining insights may be used interchangeably in the following description. The analytics application may be implemented using a Spark™ analytics framework, for example. Some processing steps performed by the analytics application include transformation, formatting, conversion, mapping, classification, summarization, and clustering. Examples of analytics applications include analytics applications that perform topic extraction, impact analytics, sentiment analytics, trend analytics, log analytics, and feature extraction. The raw data analyzed may include images, chat data, blogs, news, weather data, and feeds on social networking platforms. The insights generated may include features extracted from images, sentiments derived from feeds, and trending news.

In operation, the first analytics application 102 may process first data. In an example, the processing of the first data may be performed in a step-wise manner. For instance, a first processing step may be on the first data. The output from the first processing step may be processed in a second processing step to produce a second intermediate output. The second intermediate output may then be processed in a third processing step. The processing performed at each step may cause generation of an insight. For example, a first insight may be generated at the end of a first processing step. The information relating to the processing of the first data forms a first lineage. For instance, the first lineage may include information of the first data and the various processing steps.

The various processing steps together form a workflow of the first analytics application 102. Accordingly, the workflow of the first analytics application 102 may include a workflow used to obtain the first insight and a workflow used to obtain other insights generated during the processing. In addition to the information related to the input data and the workflow, the first lineage may also include information related to dependencies between different pieces of data, such as between the first data and the first insight.

Similar to the first analytics application 102, the second analytics application 104 may process second data. The information relating to the processing of the second data by the second analytics application 104 may be referred to as a second lineage.

In an example, the first analytics application 102 may be run in a first container 106, while the second analytics application 104 may be run in a second container 108. The first container 106 may be hosted in a first computing node 110 of the system 100, while the second container may be hosted in a second computing node 112 of the system 100. The hosting of a container in a computing node may be interchangeably referred to the deployment of the container in the computing node.

The system 100 further includes a distributed data access system 114 that can be accessed by the computing nodes of the system 100 for reading and writing data, as indicated by the double-headed arrows from the first computing node 110 and the second computing node 112 to the distributed data access system 114. The distributed data access system 114 may include, for example, a hard disk drive (HDD), a solid-state disk (SSD), a combination of both, or other persistent storage devices. The distributed data access system 114 may include a distributed filesystem (not shown in FIG. 2) to enable access from different computing nodes.

The distributed data access system 114 includes a first set of instructions 116. In operation, the first set of instructions 116 causes the system 114 to receive the first lineage of the first analytics application 102 and the second lineage of the second analytics application 104. The first set of instructions 116 also enable determining whether the first insight can be used in the processing of the second data based on a comparison of the first lineage and the second lineage. For example, when the second lineage is similar to the first lineage, it can be determined that the first insight can be used in the processing of the second data. Upon the determination, the distributed data access system 114 may provide the first insight to the second computing node 112. Accordingly, the first insight may then be used in the processing of the second data.

Therefore, the present subject matter enables reusing insights generated in one computing node at a different computing node. Since containers may be dynamically deployed on any computing node of a plurality of computing nodes and may be dynamically moved from one computing node to another computing node, the ability to reuse insights in containers across several computing nodes improves the overall efficiency of containerized analytics applications. Further, analytics applications and data can be seamlessly moved across computing nodes and across analytics clusters with minimal expenditure of computational and network resources. This will be illustrated with the help of a few example scenarios with reference to FIGS. 2-4.

In an example, the first computing node 110, the second computing node 112, and the distributed data access system 114 may each include a processor (not shown in FIG. 1). The processors may each be implemented as microprocessors, microcomputers, microcontrollers, digital signal processors, central processing units, state machines, logic circuitries, and/or any devices that manipulate signals based on operational instructions. Among other capabilities, the processors may fetch and execute computer-readable instructions stored in their respective memory units. For instance, the processor of the distributed data access system 114 may fetch and execute the first set of instructions 116. The functions of the processors may be provided through the use of dedicated hardware as well as hardware capable of executing computer-readable instructions.

The computer-readable instructions, being executable by the processors, may also be referred to as processor-executable instructions. The execution of instructions to perform a function may be interchangeably referred to as the instructions causing performance of the function or the instructions enabling performance of the function. Also, the execution of instructions by a processor of the component to perform a function may be referred to as the performance of the function by the component.

The first computing node 110, the second computing node 112, and the distributed data access system 114 may each include a memory unit (not shown in FIG. 1), which may include any non-transitory computer-readable medium including volatile memory (e.g., RAM), and/or non-volatile memory (e.g., EPROM, flash memory, Memristor, etc.). The memory units may also be external memory units, such as a flash drive, a compact disk drive, an external hard disk drive, or the like.

In addition to the processors and the memory units, the first computing node 110 and the second computing node 112 may each include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the computer-readable instructions.

The first computing node 110 and the second computing node 112 may be interconnected through a communication network (not shown in FIG. 1). The communication network may be a wireless or a wired network, or a combination thereof. The communication network may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network includes various network entities, such as transceivers, gateways, and routers.

In an example, the first computing node 110 and the second computing node 112 may be connected to the distributed data access system 114 through the communication network for reading and writing data.

Although the first set of instructions 116 is explained as being part of and being executable by the distributed data access system 114, in an example, the first set of instructions 116 may be external to the distributed data access system 114. In such a case, the first set of instructions 116 may be deployed at a location from which the lineages stored in the distributed data access system 114 can be accessed. Further, although the distributed data access system 114 is explained as storing the first lineage alone, the distributed data access system 114 may store several lineages of several analytics applications. Accordingly, upon receiving the second lineage from the second container 108 on the second computing node 112, the distributed data access system 114 may compare the second lineage with each of the several lineages and determine a lineage that is similar to the second lineage.

The distributed data access system 114 may then provide the insight corresponding to the similar lineage to the second container 108.

Figure 2:
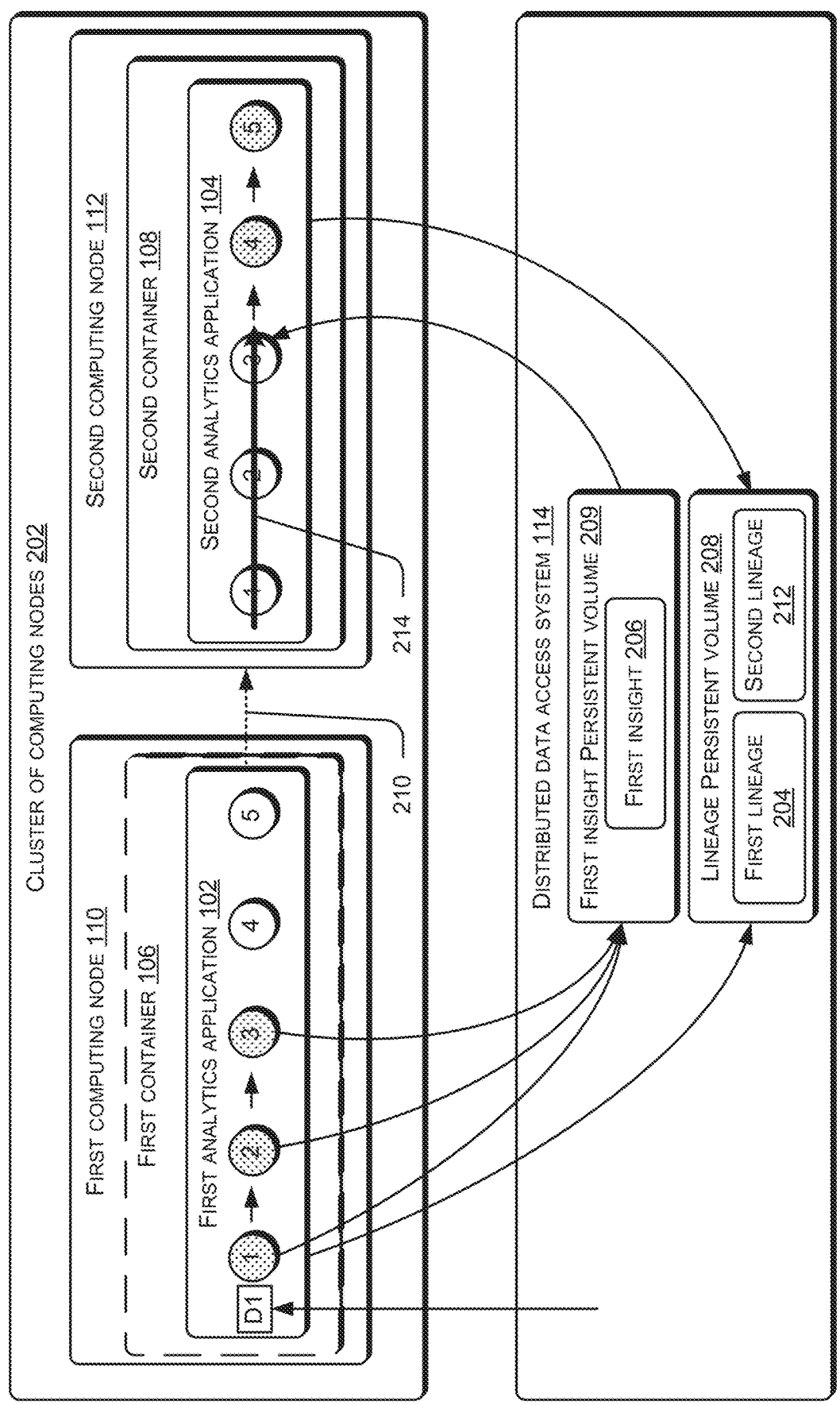
FIG. 2 illustrates reuse of insights generated by a first analytics application by a second analytics application, according to an example implementation of the present subject matter.

FIG. 2 illustrates reuse of insights generated by the first analytics application 102 by the second analytics application 104, according to an example implementation of the present subject matter. The first computing node 110 and the second computing node 112 may be part of a cluster of computing nodes 202 which share a set of analytics jobs. A cluster of computing nodes may be interchangeably referred to as an analytics cluster.

The first analytics application 102 may receive the first data, represented by the block D1, from the distributed data access system 114. As mentioned earlier, the first analytics application 102 may process the first data D1 in a step-wise manner. The total number of steps to be performed to complete processing of the first data D1 may be five in number, as represented by the bubbles 1, 2, 3, 4, and 5. The information of the first data D1 and the processing steps to be performed may be part of the first lineage 204. The first analytics application 102 may first determine the first lineage 204 before initiating the actual processing of the first data D1. While the processing is performed, the first lineage 204 may be updated with the insights generated at the end of each processing step. Thus, upon completion of the processing by the first analytics application 102, the first lineage 204 includes information of the first data D1, the processing steps performed (also referred to as workflow of the analytics application), and the insights (intermediate and final). In an example, the first lineage 204 may include a Directed Acyclic Graph (DAG). The delaying of the initiation of actual processing till the generation of the entire first lineage may be referred to as lazy computation.

When the first analytics application 102 is processing the first data D1, the processing may move from the first step to the second step and from the second step to the third step. The completed processing steps are illustrated by hatched bubbles, such as the hatched bubbles 1, 2, and 3 in the first analytics application 102. During completion of the processing steps, as mentioned earlier, insights may be generated. For example, the first insight 206 may be generated at the end of the first processing step.

In an example, the analytics cluster 202 tracks the first lineage 204 and stores it in a persistent volume (PV) of the distributed data access system 114. The PV in which the first lineage 204 is stored is referred to as a lineage PV 208. The storage of the first lineage 204 in the lineage PV 208 is denoted by the arrow from the first analytics application 102 to the lineage PV 208.

To track the first lineage 204, the analytics cluster 202 includes a set of instructions (not shown in FIG. 2) that may be plugged in to the analytics framework (not shown in FIG. 2), which is used to implement the first analytics application 102. The analytics framework may be, for example, Spark™ analytics framework. In addition to the first lineage 204, the first insight 206 may also be stored in the distributed data access system 114. The first insight 206 may be stored in a first insight PV 209 of the distributed data access system 114, as indicated by the arrow from the bubble 1 to the first insight PV 209. Similarly, other insights generated from the other processing steps will also be stored to the first insight PV 209, as indicated by the arrows from the bubbles 2 and 3 to the first insight PV 209.

The lineage PV 208 and the first insight PV 209 may be carved, i.e., provisioned, from the distributed data access system 114. In an example, the lineage PV 208 may be common for all containers hosted in the analytics cluster 202. For instance, the lineages from all analytics applications running in the analytics cluster 202 may be stored in the lineage PV 208. However, the insight PVs may be specific to a particular container or to a particular group of containers. For example, the first insight PV 209 may be specific to the first container 106.

Sometimes, the first container 106, in which the first analytics application 102 is running, may be disrupted in the first computing node 110 before the completion of all processing steps. This is indicated by a dashed representation of the block 106 in FIG. 2. For example, the first container 106 may be disrupted before the completion of the fourth and fifth processing steps. Upon disruption, the first container 106 may be moved to the second computing node 112, which is in the same analytics cluster 202 as the first computing node 110. The movement of the first container 106 to the second computing node 112 is represented by the dotted arrow 210. Such a movement may be performed in response to the failure of the first computing node 110 or for load balancing.

In the second computing node 112, the second container 108 may be deployed as a second instance of the first container 106. Further, in this case, the second analytics application 104 may be a second instance or a replication of the first analytics application 102, and the second data, to be processed by the second container 108, is the same as the first data D1. To initiate processing of the first data D1, the second analytics application 104 generates the second lineage 212, before processing of the first data D1. The second lineage 212 includes the first data D1 and the processing steps to be applied to the first data D1. The second lineage 212 may be tracked by the analytics cluster 202 and be provided to the distributed data access system 114 for being compared with the lineages stored in the distributed data access system 114. The distributed data access system 114 may receive the second lineage 212 in the lineage PV 208, as indicated by the arrow from the second analytics application 104 to the lineage PV 208.

Upon receiving the second lineage 212, the distributed data access system 114 may compare the second lineage 212 with the first lineage 204. A comparison of two lineages may include comparison of the respective input data of the two lineages and the comparison of the respective processing steps of the two lineages. Accordingly, two lineages may be determined to be similar (i) if at least a part of input data of one lineage is same as at least a part of input data of another lineage and (ii) if at least a first processing step of one lineage is the same as a first processing step of another lineage.

As will be understood, the second lineage 212 would be similar to the first lineage 204, as the first lineage also includes the first data D1 as the input and the same processing steps as the second lineage. Since the second lineage 212 is similar to the first lineage 204, upon comparing the second lineage 212 with the first lineage 204, the first set of instructions 116 (not shown in FIG. 2) may enable determining that at least a part of the processing on the first data D1 has already been performed. Accordingly, the distributed data access system 114 may provide the first insight 206 and other insights available in the first insight PV 209 to the second computing node 112. Subsequently, the first insight 206 and other insights may be used in the processing of the first data D1. Accordingly, the second analytics application 104 does not perform all processing steps involved in the processing of the first data D1, but a remainder of the processing steps alone, such as the processing steps 4 and 5.

Thus, the second analytics application 104 does not perform the first, second, and third processing steps, as indicated by arrow 214, and performs the fourth and fifth processing steps using the first insight 206 and other previously-generated insights. Thus, the second analytics application 104 avoids performing the previously-performed processing steps 1, 2, and 3, thereby saving considerable amount of time and computational resources. It is to be noted that the first analytics application 102 does not have to checkpoint its progress in the first computing node 110 for enabling the reuse of the insights generated by the first analytics application 102. Thus, the additional burden on the first analytics application 102 associated with such checkpointing is eliminated.

In an example, in response to the determination that the first lineage 204 is similar to the second lineage 212, to provide the first insight 206 to the second container 108, the first set of instructions 116 may cause the mounting of the first insight PV 209, which is specific to the first container 106, on the second container 108. This facilitates accessing the first insight 206 and other insights stored in the first insight PV 209 by the second analytics application 104. In some cases, it may not be possible to dynamically mount a PV on an already-running container. In such cases, to facilitate mounting the first insight PV 209 on the second container 108, the second container 108 may be committed, and re-initiated with a committed view. When the second container 108 is re-initiated, the first insight PV 209 may be mounted on the second container 108. To commit and re-initiate containers, the first set of instructions 116 may enable the distributed data access system 114 to interact with a container orchestrator (not shown in FIG. 2), which performs deployment and committing of containers in the analytics cluster 202.

By carving insight PVs for each container and mounting them on containers for which insight reuse is determined to the possible, the present subject matter facilitates and ensures an efficient insight reuse in a containerized analytics environment.

Although FIG. 2 has been explained with reference to different instances of the same container reusing insights, in some examples, the insights may be reused across different containers, as will be explained below.

FIG. 3(a) illustrates reuse of insights across different containers, according to an example implementation of the present subject matter.

Generally, upon ingestion of data in the distributed data access system 114 for processing, a container orchestrator (not shown in FIG. 3(a)) may deploy a container running an analytics application for processing the data. The container orchestrator may be, for example, Kubernetes™. The ingested data may be interchangeably referred to as raw data. The deployed container and the analytics application may correspond to a type of the ingested data. The analytics application may then process the ingested data in various processing steps to derive various insights from the ingested data. For example, when feeds from a social networking platform are ingested, a corresponding analytics application may perform various steps related to sentiment analysis on the feeds. Similarly, when images are ingested, various processing steps related to deep learning may be performed by an analytics application corresponding to the images.

In accordance with the present subject matter, for each type of ingested data, lineages are tracked in the analytics cluster at which the ingested data is processed. Such lineages are then stored in the distributed data access system 114, as explained earlier. Therefore, the processing steps performed on each type of ingested data by its corresponding analytics application is tracked. Through the stored lineages, the first set of instructions 116 may cause the distributed data access system 114 to learn the type of processing to be performed on different types of ingested data.

Subsequently, when the first data D1 is ingested in the distributed data access system 114, the first set of instructions 116 can enable determination of the type of the first data D1. In an example, the type of the first data D1 may be determined based on a location on the distributed data access system 114 in which the first data D1 gets ingested. For example, when the first data D1 gets ingested in a folder dedicated to feeds from social networking platforms, it may be determined that the first data D1 is a feed from a social networking platform. Similarly, when the first data D1 is ingested in a folder dedicated to images, it may be determined that the first data D1 is an image. In other examples, other techniques for determining the type of the first data D1 may be utilized.

Based on the type of the first data D1, the first set of instructions 116 may then enable determination of the processing to be performed on the first data D1. For this, the first set of instructions 116 may enable determining the processing performed on earlier data that is of the same type as the first data D1 based on the lineage associated with the earlier data. For example, when the first data D1 is determined to be an image, it may be determined that the first data D1 is to be subjected to deep learning because earlier images were also subjected to deep learning.

Upon determining the type of the first data D1, the first set of instructions 116 may cause deployment of the first container 106 to process the first data D1. In an example, to deploy the first container 106, the first set of instructions 116 may enable determination of an earlier container (not shown in FIG. 3(a)) in which the earlier data was processed. Subsequently, the first set of instructions 116 may cause cloning of the earlier container as the first container 106. In this manner, the present subject matter ensures that a container that can efficiently process the first data D1 is deployed for processing the first data D1.

It is to be noted that the above processing of the first data D1 is performed before the container orchestrator deploys a container for processing the first data D1. Accordingly, the above processing may be referred to as proactive processing. Further, the above deployment of the first container 106 may be referred to as proactive deployment.

Upon proactively deploying the first container 106, the first analytics application 102 may generate the first lineage 204 and then process the first data D1 to derive insights, such as the first insight 206. As explained earlier, the first lineage 204 and the first insight 206 may be stored in the distributed data access system 114.

Subsequently, the container orchestrator may deploy the second container 108 to process the first data D1. The second container 108 may be deployed in the second computing node 112 and may run the second analytics application 104. In this case, the second data that is to be processed by the second analytics application 104 is the same as the first data D1. To process the second data, the second analytics application 104 may then generate the second lineage 212, which is provided to the distributed data access system 114. Thereafter, as explained earlier, the first set of instructions 116 causes comparison of the second lineage 212 with the first lineage 204 and determination that the first lineage 204 is similar to the second lineage 212. Accordingly, the first insight 206 and other insights generated by the first analytics application 102 in the first container 106 may be reused in the processing by the second analytics application 104. For this, as explained earlier, the first insight PV 209 may be mounted on the second container 108. Since all insights to be derived out of the second data have already been derived by the first analytics application 102, the second analytics application 104 is prevented from repeating the processing.

Since the first container 106 is proactively deployed, the steps involved in the processing of the first data D1 are completed even before the container orchestrator deploys the second container 108. Thus, the insights from the first data D1 can be derived quickly after the deployment of the second container 108. Therefore, the overall efficiency of the containerized analytics applications is improved.

Figure 3B:
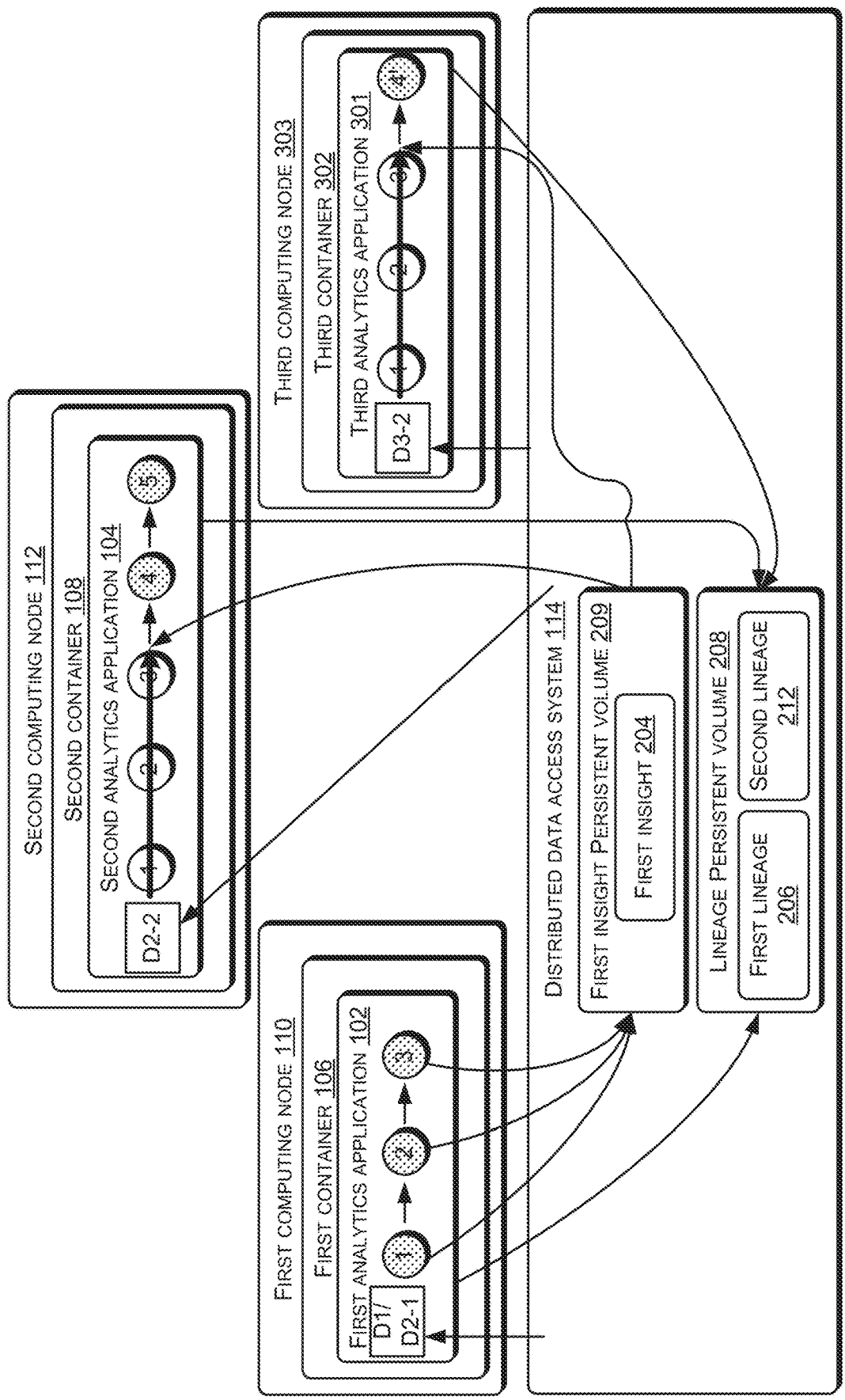
FIG. 3(b) illustrates reuse of insights in a scenario in which the ingested data is to be processed by different analytics applications, according to an example implementation of the present subject matter.

FIG. 3(a) has been explained with reference to a scenario in which the ingested data is processed by a single type of analytics application to derive a single set of insights. However, at times, the ingested data may be processed by different analytics applications in different manners to derive different sets of insights. For example, the ingested data may be log data relating to the operation of a power plant. Using the log data, one analytics application may determine capacity utilization of the power plant, while another analytics application may detect anomalies in the operation of the power plant. Accordingly, to derive the different sets of insights, the container orchestrator may deploy different containers, each running a different analytics application, for processing the ingested data. The reuse of insights in such a case will be explained with reference to FIG. 3(b).

FIG. 3(b) illustrates reuse of insights in a scenario in which the ingested data is to be processed by different analytics applications, according to an example implementation of the present subject matter.

As mentioned above, the first data D1 may be processed by different analytics applications in different manners. For example, the second analytics application 104 may process the first data D1 in five steps, as illustrated by the bubbles 1, 2, 3, 4, and 5, while a third analytics application 301 may process the first data D1 in four processing steps, as illustrated by the bubbles 1, 2, 3, and 4'. The third analytics application 301 may be running in a third container 302 hosted in a third computing node 303. Although different analytics applications may process the first data D1 in different manners, some processing steps may be common among the different analytics applications. For example, the first three processing steps between the second analytics application 104 and the third analytics application 301 may be the same.

Since the distributed data access system 114 learns lineages of different analytics applications, based on determination of the type of the first data D1, the distributed data access system 114 can determine that the first data D1 may be processed by the second analytics application 104 and the third analytics application 301. Further, the distributed data access system 114 may determine that the first three processing steps performed by the second analytics application 104 and the third analytics application 301 are the same. In such a case, the distributed data access system 114 may proactively deploy the first container 106 running the first analytics application 102 in the first computing node 110. The first analytics application 102 may then perform the processing steps 1, 2, and 3 alone and derive insights due to the processing. Further, the first lineage 204, which, in this case, corresponds to the processing steps 1, 2, and 3, and the derived insights, including the first insight 206, may then be stored in the distributed data access system 114.

The preliminary processing performed by the first analytics application 102, which are to be performed by the second and third analytics applications, may be referred to as pre-processing. The processing steps performed as part of the pre-processing may the processing steps that are common to several analytics applications, such as the second analytics application 104 and the third analytics application 301. In an example, the processing steps performed as part of the pre-processing includes extracting and mapping features in each feed from a social networking platform and filtering fields that are not be processed and stop words.

Figure 3C:
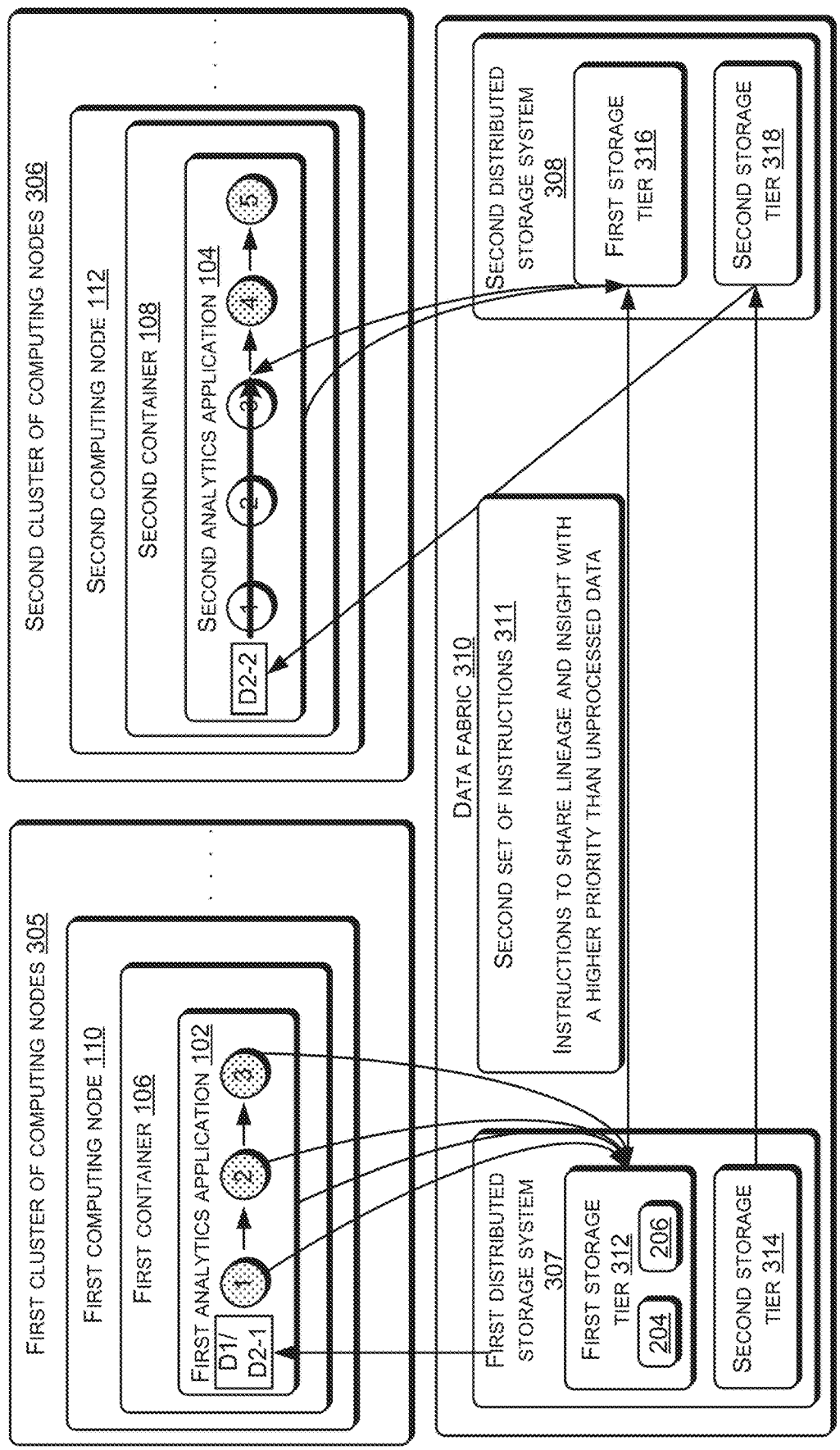
FIG. 3(c) illustrates reuse of insights across containers deployed in different analytics clusters, according to an example implementation of the present subject matter.

When the container orchestrator deploys the second container 108 to process the first data D1, as explained earlier, the second lineage 212 may be received by the distributed data access system 114 in the lineage PV 208 for comparison. The transfer of the second lineage 212 is indicated by the arrow from the second analytics application 104 to the lineage PV 208. Based on the comparison with various lineages in the lineage PV 208, it may then be determined that the second lineage 212 is similar to the first lineage 204. Accordingly, the first insight 206 and the other insights derived by the first analytics application 102 may be reused in the processing performed by the second analytics application 104. Therefore, the second analytics application 104 does not perform the processing steps 1, 2, and 3, and performs the processing steps 4 and 5 as illustrated in FIG. 3(*b*). Similarly, when the container orchestrator deploys the third container 302 to process the first data D1, the third analytics application 301 performs the processing step 4' alone.

Since the pre-processing is completed in the first container 106, the time consumed for the processing in the second analytics application 104 and the third analytics application 301 is considerably reduced. Further, as will be explained later, in some cases, the second container 108 may be deployed in an analytics cluster that is different from an analytics cluster in which the first container 106 is deployed. In such cases, the pre-processing reduces the amount of data to be transferred across the analytics clusters.

In an example, the ingested data may include a plurality of parts, of which a first part may have to be processed by both the second analytics application 104 and the third analytics application 301, while a second part and a third part may have to be processed by the second analytics application 104 and the third analytics application, respectively. In such a case, the distributed data access system 114 may determine the first part to be the first data D1, thereby allowing provision of insights that are usable by both the second analytics application 104 and the third analytics application 301. Further, in such a case, the second data to be processed by the second analytics application 104 may include the first part and the second part of the plurality of parts. The first part, which is the same as the first data D1, may also be represented as D2-1 and the second part may be represented as D2-2. Since the first part D2-1 is already processed by the first analytics application 102, the second analytics application 104 receives the second part D2-2, but not the first part D2-1, from the distributed data access system 114. Instead of the first part D2-1, the second analytics application 104 receives the insights derived out of the first part D2-1, such as the first insight 206 from the distributed data access system 114. Similarly, the third analytics application 301 may receive a third part D3-2 from the distributed data access system 114 and the insights derived out of the first part D1, which may also be referred to as the first part D3-1.

In some examples, even if the ingested data includes a single part that is to be processed by a single analytics application using a single set of processing steps, the pre-processing performed in the proactively-deployed container may not include all the processing steps involved in the processing of the ingested data. The steps to be executed as part of the pre-processing may be determined based on the amount of processing resources to be expended in the processing steps. In an example, the initial processing steps that are less resource-intensive may be executed in the proactively-deployed container. For instance, if the ingested data is the first data D1, which is to be processed by the second analytics application 104 using the processing steps 1-5, and not to be processed by any other analytics application, the first analytics application 104 may execute the processing steps 1-3 that are less resource-intensive. The execution of the less resource-intensive processing steps in the proactively-deployed container ensures that the overall performance of the analytics cluster hosting the proactively-deployed container is not significantly affected. Further, even if the container orchestrator deploys a container for processing the raw data in a different analytics cluster, the amount of data to be transferred to that analytics cluster is minimal, as the transferred data includes insights and lineage generated due to the pre-processing, and not the raw data.

In some examples, the first computing node 110 and the second computing node 112 may be part of the same analytics cluster. Accordingly, the distributed data access system 114 may be a distributed storage system associated with the analytics cluster. Further, in such cases, the second computing node 112 may access the first insight through the distributed filesystem of the distributed data access system 114 for reuse of insights. In some other examples, the first computing node 110 and the second computing node 112 may be part of different analytics clusters. For example, the first computing node 110 and the second computing node 112 may be part of a hybrid cloud environment. The reuse of the insights in such a case will be explained in the subsequent paragraphs.

FIG. 3(*c*) illustrates reuse of insights across containers deployed in different analytics clusters, according to an example implementation of the present subject matter.

The first computing node 110 may be deployed in a first analytics cluster 305, while the second computing node 112 may be deployed in a second analytics cluster 306. The first analytics cluster 305 may have a first distributed storage system 307 associated with itself, while the second analytics cluster 306 may have a second distributed storage system 308 associated with itself. For example, the first distributed storage system 307 may include storage of all computing nodes that are present in the first analytics cluster 305. Similarly, the second distributed storage system 308 may include the storage of all computing nodes that are present in the second analytics cluster 306. In such a case, the first distributed storage system 307 may be accessed by the first analytics cluster 305 alone, and the second distributed storage system 308 may be accessed by the second analytics cluster 306 alone.

To enable access of the first lineage 204 and the first insight 206, stored in the first distributed storage system 307, to the second analytics cluster 306, the distributed data access system 114 may be implemented as a data fabric 310, which provides a converged platform that supports the storage, processing, analysis, and management of disparate data stored in different analytics clusters. The data fabric 310 may be an architecture and a set of data services that enable data management across cloud and on-premises. The data fabric 310 is accessible to both the first analytics cluster 305 and second analytics cluster 306, and may include a second set of instructions 311 that can facilitate sharing insights and lineages from one storage system of the data fabric 310 to another storage system of the data fabric 310. The second set of instructions 311 may be implemented as a service in the data fabric 310. The insights and lineages may be collectively referred to as processed data.

Upon generation of the first lineage 204 and the first insight 206, the second set of instructions 311 may cause sharing of the first lineage 204 and the first insight 206 from the first distributed storage system 307 to the second distributed storage system 308. The sharing of the data from a storage system of one analytics cluster to a storage system of another analytics cluster may be referred to as sharing of data across the data fabric 310. Further, such a sharing of data may be interchangeably referred to as transferring data across the data fabric 310.

The sharing of the processed data across the data fabric 310 enables accessing the lineages and the insights across several analytics clusters. Thus, containers deployed in any analytics cluster can reuse insights generated in containers deployed in any other analytics clusters, thereby facilitating faster processing.

Since the insights generated by a container in an analytics cluster can be reused in any other container in any other analytics cluster, the containers that are to be proactively deployed may be deployed in any analytics cluster. In an example, in response to ingestion of the raw data in a storage system, such as the first distributed storage system 307, the first set of instructions 116 may enable proactively deploying a container for its pre-processing in an analytics cluster with which the distributed storage system is associated, such as the first analytics cluster 305. As explained earlier, the processing steps executed as part of the pre-processing may be the processing steps that are common to several analytics applications and/or processing steps that are less resource-intensive.

As will be understood, according to the data gravity principle, applications that are to process data are to be deployed closer to the location of the data. By proactively deploying containers closer to the site of ingestion of data for performing pre-processing, the present subject matter ensures that the data gravity principle is satisfied. Thus, the present subject matter optimizes the performance of containerized analytics applications, while also satisfying data gravity principle.

Further, if the container orchestrator deploys a container for complete processing of the raw data in a different analytics cluster, such as the second analytics cluster 306, the raw data is not to be transferred across the data fabric 310, such as from the first distributed storage system 307 to the second distributed storage system 308. Instead, lineages and insights generated due to pre-processing, such as the first lineage 204 and first insight 206, alone may be transferred across the data fabric 310. Since the processed data are much smaller in size compared to the raw data, transferring the lineage and insights alone considerably decreases the data transfer costs and network traffic. Further, even if a part of the raw data is unprocessed in the proactively-deployed container, such as the second part D2-2, the unprocessed part alone is to be shared across the data fabric 310, and not the processed part, such as the first part D2-1. This also reduces the amount of data to be transferred across the data fabric 310. The unprocessed part of the raw data, such as the second part D2-2, may be referred to as unprocessed data.

In an example, upon proactively deploying the first container 106 in the first analytics cluster 305, the distributed data access system 114 may inform the container orchestrator of the proactive deployment. Accordingly, the container orchestrator may hold the deployment of the second container 108 in the second analytics cluster 306 till the insights are available from the first container 106. This prevents movement of the first data D1 across the data fabric 310.

Since the amount of data to be transferred across the data fabric 310 is reduced, the container orchestrator does not have to deploy the container for processing the raw data near the site of ingestion. For example, the container orchestrator does not have to deploy the second container 108 in the first analytics cluster 305 just because the first data D1 is ingested in the first distributed storage system 307. Rather, the container orchestrator can deploy the second container 108 in an analytics cluster which may have the highest amount of processing resources available or which may be most suited to process the first data D1. This increases the flexibility for selecting a target analytics cluster for a container.

In an example, the storage system of each analytics cluster may include a plurality of storage tiers. For example, the first distributed storage system 307 includes a first storage tier 312 and a second storage tier 314. Further, the second distributed storage system 308 includes a first storage tier 316 and a second storage tier 318. The first storage tier 312 and the first storage tier 316 will be collectively referred to as first storage tiers, and individually referred to as first storage tier. Further, the second storage tier 314 and the second storage tier 318 will be collectively referred to as second storage tiers and individually referred to as second storage tier. The first storage tier may have a greater speed of access compared to the second storage tier. For example, the first storage tier may include SSDs, while the second storage tier includes HDDs.

In such a case, the processed data may be stored in the first storage tier, such as the first storage tier 312, as indicated by the storage of the first lineage 204 and the first insight 206 in the first storage tier 312. For this, the first analytics cluster 305 may provide instructions to the first distributed storage system 307 to this effect. The instructions may be provided, for example, through an input-output control (IOCTL) call or using an extended attribute when sending a write call to the first distributed storage system 307. Subsequently, when the processed data are transferred to the storage system of another analytics cluster, such as to the second distributed storage system 308, the processed data are stored in the first storage tier, such as the first storage tier 316. This is indicated by the arrow from the first storage tier 312 to the first storage tier 316. In an example, a lineage PV and insight PVs, such as the lineage PV 208 and the first insight PV 209 described above, may be carved from each first storage tier for storing the processed data.

In contrast to the processed data, any raw data that is transferred from one storage system to another, such as the unprocessed second part D2-2, is stored in the second storage tier, such as the second storage tier 318. This is indicated by the arrow from the second storage tier 314 to the second storage tier 318.

The transfer of data from the first distributed storage system 307 to the second distributed storage system 308 may be performed periodically. Alternatively, the transfer of data may be triggered asynchronously when new lineages and insights are stored in the first distributed storage system 307. In another example, the transfer of data may be performed in response to the deployment of the second container 108 by the container orchestrator.

The storage of the processed data alone in the first storage tier reduces the amount of data to be stored in the first storage tier. This facilitates a more efficient utilization of the first storage tier, which has a greater speed of access compared to the second storage tier. Further, in an example, the processed data are shared across the data fabric 310 with a higher priority as compared to any unprocessed data that is shared across the data fabric 310. For instance, the processed data may be shared before the unprocessed data are shared. The priority for sharing may be determined by execution of the second set of instructions 311. The second set of instructions 311 may enable prioritization of the data to be shared based on information received from the distributed data access system 114.

The sharing of the lineages and insights across the data fabric 310 with priority ensures that the insights are available for reuse in containers as quickly as possible. Thus, any latency in the processing by the second analytics application 104 due to transfer of the insights from a different analytics cluster is avoided. Further, since the processed data are much smaller in size compared to the raw data, the transfer of the insights and lineages across the data fabric 310 can be completed quickly, without causing significant network traffic. The small latency associated with sharing of data across the data fabric 310 provides the container orchestrator with the flexibility of deploying containers for processing data in any analytics cluster without considering proximity of the deployed container to the raw data to be processed.

In some cases, the data to be transferred from one storage system to another may be determined based on various criteria, as will be explained with reference to FIG. 4.

Figure 4:
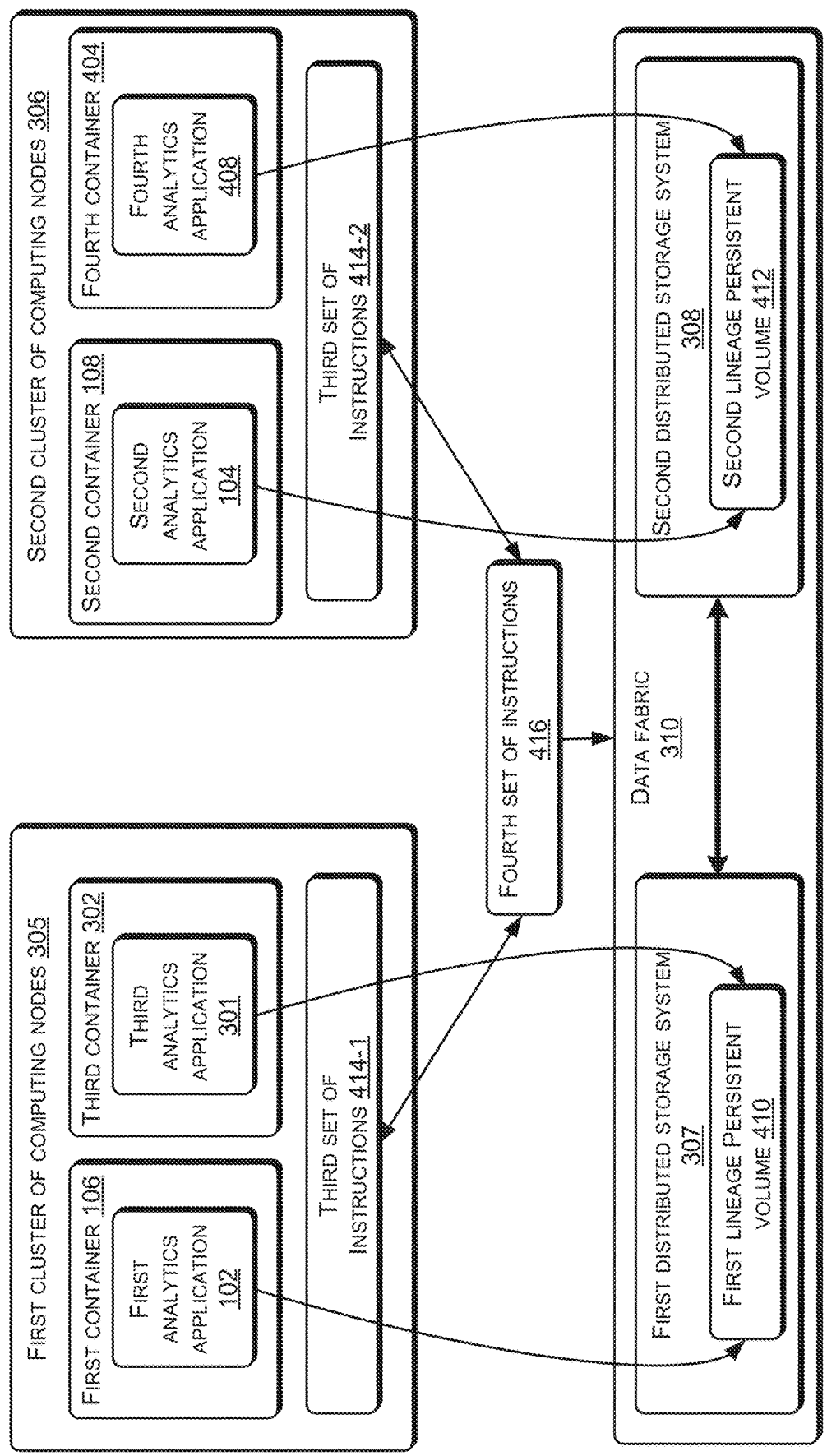
FIG. 4 illustrates sharing data from one analytics cluster to another analytics cluster, according to an example implementation of the present subject matter.

FIG. 4 illustrates sharing data from one analytics cluster to another analytics cluster, according to an example implementation of the present subject matter.

As illustrated in FIG. 4, each analytics cluster may host several containers. For example, the first analytics cluster 305 hosts the first container 106 and the third container 302 and the second analytics cluster 306 hosts the second container 108 and a fourth container 404. Similar to the first container 106 and the second container 108, the third container 302 and the fourth container 404 may each have an analytics application running thereon. For instance, the third container 302 may have the third analytics application 301 running thereon and the fourth container 404 may have a fourth analytics application 408 running thereon.

Each analytics application may process data to derive insights out of the data. As explained earlier, an analytics cluster hosting an analytics application may track lineages of the analytics application and may store the same in the distributed storage system associated with the analytics cluster. For example, the first analytics cluster 305 may track the first lineage 204 and the lineage of the third analytics application 301 and store them in the first distributed storage system 307. Similarly, other lineages of other computing nodes in the first analytics cluster 305 may be stored in the first distributed storage system 307.

In an example, the lineages generated in an analytics cluster may be stored in a lineage PV, such as the lineage PV 208, of the analytics cluster. For instance, the lineages generated in the first analytics cluster 305 may be stored in a first lineage PV 410 and the lineages generated in the second analytics cluster 306 may be stored in a second lineage PV 412. The storage of the lineages in a lineage PV may be referred to as writing lineages to the lineage PV. The first lineage PV 410 may be included in the first distributed storage system 307 and the second lineage PV 412 may be stored in the second distributed storage system 308. The first lineage PV 410 and the second lineage PV 412 may be implemented as PVs carved out of the first distributed storage system 307 and the second distributed storage system 308, respectively, as explained earlier.

To facilitate tracking of the lineages by the analytics clusters, each analytics cluster may include a third set of instructions 414. The third set of instructions 414 may be plugged-in to the analytics framework, such as the Spark™ analytics framework. The third set of instructions 414, when executed, may intercept writes to the lineage PV of the analytics cluster that includes the third set of instructions 414. In an example, the third set of instructions 414 may be run in a dedicated container (not shown in FIG. 4). The third set of instructions 414 deployed in the first analytics cluster 305 may be referred to as the third set of instructions 414-1 and the third set of instructions 414 deployed in the second analytics cluster 306 may be referred to as the third set of instructions 414-2.

Since lineages of several analytics applications are written to a lineage PV, there may be inconsistency among the lineages written to the lineage PV. For example, several analytics applications processing similar type of data may simultaneously write similar lineages to the first lineage PV 410, causing inconsistency among the lineages. To prevent the inconsistency among the lineages stored to a lineage PV, the third set of instructions 414 may enable intercepting the writes to the lineage PV.

To ensure consistency, in an example, the third set of instructions 414 causes serialization of the lineages written to the lineage PV. For instance, the lineages are written to the lineage PV sequentially, instead of simultaneously. In an example, the third set of instructions 414 causes serialization of lineages of analytics applications that process data of the same type alone, while allowing lineages from analytics applications processing different types of data to be written to the lineage store simultaneously. The analytics applications that process data of the same type may be referred to as analytics applications of the same type. In an example, the third set of instructions 414 may cause interception of just the writes to the lineage store, and not the reads from the lineage store by the containers. Further, in an example, the lineages may be written to the lineage PV in batches.

As mentioned earlier, the processed data, including lineages and insights, from one analytics cluster may be shared with another analytics cluster across the data fabric 310. In some examples, not all processed data generated in an analytics cluster may be used in other analytics clusters. For example, if the first analytics cluster 305 includes image-processing analytics applications, which are involved in the processing of images, and the second analytics cluster 306 does not have any image-processing analytics applications, the insights generated by the image-processing analytics applications of the first analytics cluster 305 may not be used in the second analytics cluster 306.

To determine the lineages and insights to be shared with another analytics cluster, a fourth set of instructions 416 may be utilized. Although not shown, the fourth set of instructions may be provided in the data fabric 310. The fourth set of instructions 416 may be deployed in a computing node (not shown in FIG. 4) that can communicate with all analytics clusters that share processed data among each other. Alternatively, the fourth set of instructions 416 may be deployed in any of the analytics clusters that share processed data among each other. The determination of the parts of processed data will be explained with reference to a scenario in which the first analytics cluster 305 shares processed data with the second analytics cluster 306.

The fourth set of instructions 416 may be coupled to the third set of instructions 414-1, as indicated by the arrow from third set of instructions 414-1 and the fourth set of instructions 416. Through the coupling, the third set of instructions 414-1 and the fourth set of instructions 416 enable communicating information regarding updates to the processed data generated by the first analytics cluster 305 since a previous instance at which the processed data was shared with the second analytics cluster 306. The updates may be referred to as incremental updates.

In an example, the fourth set of instructions 416 may enable selecting a portion of the incremental updates as the data to be shared across the data fabric 310. The portion may be determined based on the processed data from the first analytics cluster 305 that was used by the containers in the second analytics cluster 306 in the past. For instance, of different types of processed data shared with the second analytics cluster 306 in the past, the types of processed data actually used by the second analytics cluster 306 may be monitored.

Subsequently, the portion of incremental updates similar to the processed data used in the second analytics cluster 306 may be selected as the data to be shared. For example, if the containers in the second analytics cluster 306 used insights related to feeds from social networking platforms, but did not use insights related to images, the incremental updates related to the feeds alone may selected, while not selecting the incremental updates related to the images.

To determine the past usage of the processed data by the containers in the second analytics cluster 306, the fourth set of instructions 416 may cause receiving the information related to the past usage from the second analytics cluster 306 using the third set of instructions 414-2, as indicated by the arrow connecting the fourth set of instructions 416 and the third set of instructions 414-2.

The sharing of processed data across the data fabric 310 based on past usage of processed data ensures that the processed data that is likely to be used alone is shared. This further minimizes the data transfer costs and the network traffic.

Although sharing of processed data is explained with reference to movement of processed data in one direction, i.e., from the first distributed storage system 307 to the second distributed storage system 308, the processed data may be shared in the other direction as well. This ensures that all processed data that is likely to be reused in other analytics clusters are shared across the data fabric 310. Further, although sharing of processed data is explained with reference to two analytics clusters, in some cases, the sharing may happen between more than two analytics clusters as well. In such cases, the distributed storage systems associated with all the analytics clusters may be part of the data fabric 310. Further, in such cases, processed data may be shared between any two analytics clusters, and the fourth set of instructions 416 mediates all such sharing of the processed data.

Although in FIGS. 1-4, each analytics application has been explained as running in a single container, in some scenarios, each analytics application may span multiple containers. Further, such multiple containers, in which an analytics application is running, may be hosted in different computing nodes. It is to be noted that the present subject matter facilitates insight reuse across containers in such scenarios as well, using the techniques explained above.

Figure 5:
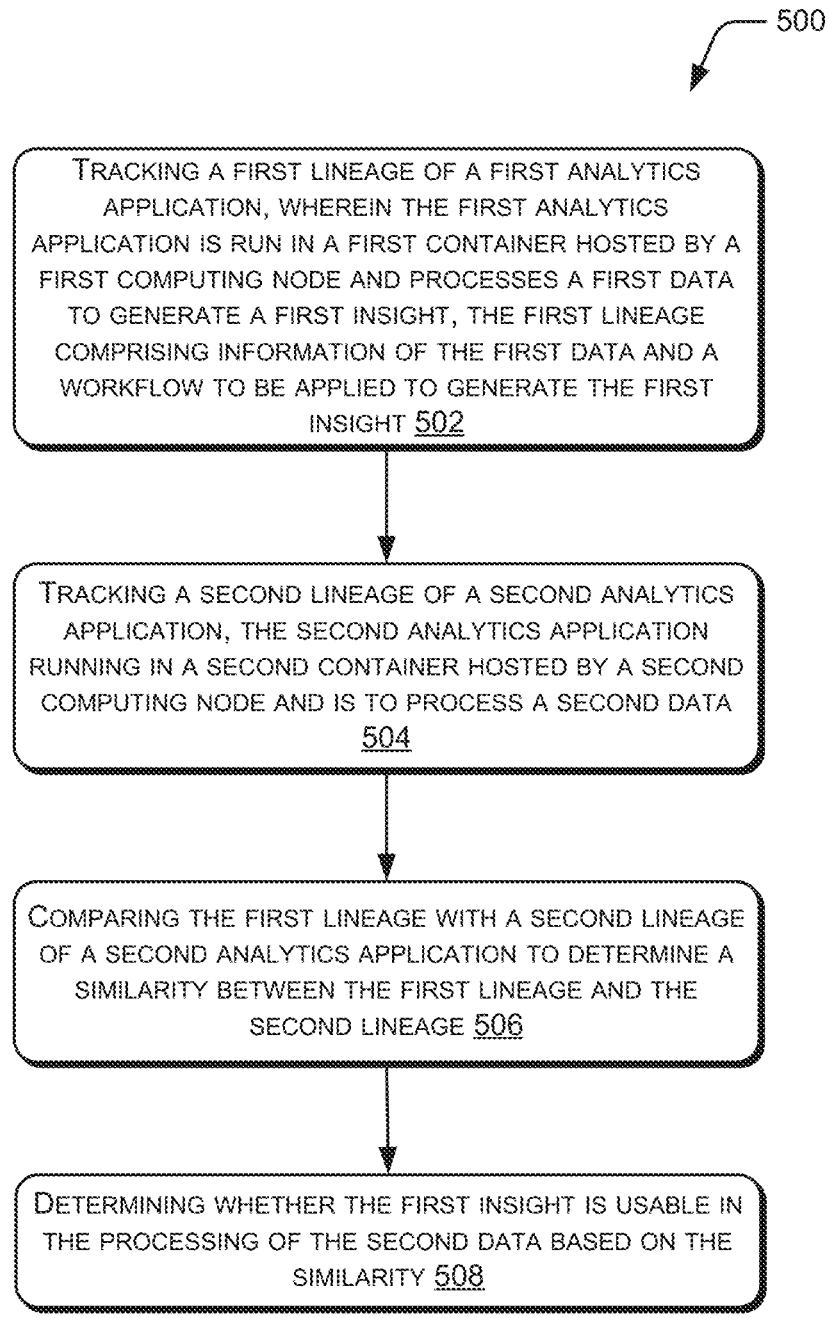
FIG. 5 illustrates a method for reusing insights generated in one container in another container, according to an example implementation of the present subject matter.
Figure 6:
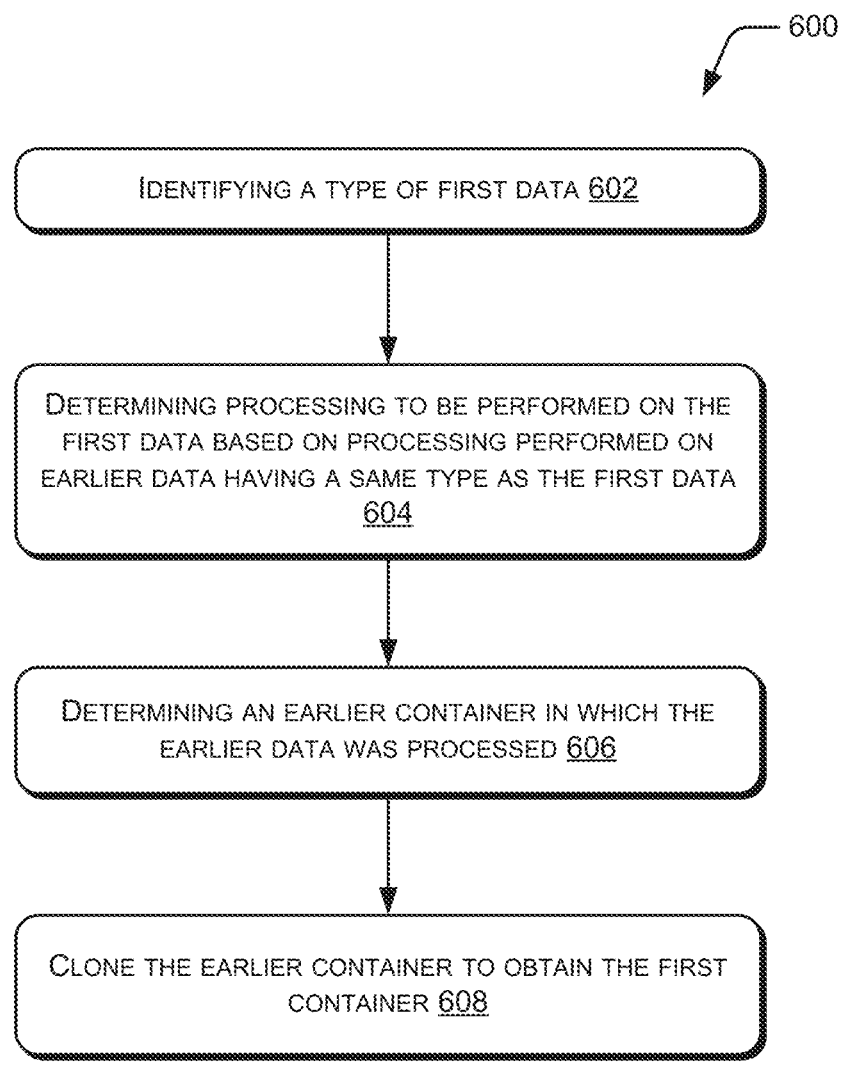
FIG. 6 illustrates a method for proactively deploying a container to process a first data, according to an example implementation of the present subject matter.

FIGS. 5 and 6 illustrate methods 500 and 600, respectively, for reusing insights generated in one container in another container, according to example implementations of the present subject matter.

The order in which the methods 500 and 600 are described is not intended to be construed as a limitation, and any number of the described method blocks may be combined in any order to implement the methods 500 and 600, or an alternative method. Furthermore, the methods 500 and 600 may be implemented by processor(s) or computing device(s) through any suitable hardware, non-transitory machine-readable instructions, or a combination thereof.

It may be understood that steps of the methods 500 and 600 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 500 and 600 may be implemented in a variety of systems; the methods 500 and 600 are described in relation to the aforementioned system 100, for ease of explanation. In an example, the steps of the methods 500 and 600 may be performed by a processing resource.

Referring to method 500, at block 502, a first lineage of a first analytics application is tracked. The first lineage may be, for example, the first lineage 204 and the first analytics application may be, for example, the first analytics application 102. The first analytics application is run in a first container, such as the first container 106, which is hosted by a first computing node, such as the first computing node 110. The tracking may be performed using a third set of instructions, such as the third set of instructions 414-1, which may be deployed in an analytics cluster that includes the first computing node.

The first analytics application processes first data, such as the first data D1, to generate a first insight, such as the first insight 206. The first lineage includes information of the first data and a workflow used to obtain the first insight.

At block 504, a second lineage of a second analytics application is tracked. The second analytics application may be the second analytics application 104, running in a second container 108 hosted by the second computing node 112. The second analytics application is to process a second data, which may include the first part D2-1 and the second part D2-2. In an example, the tracking may be performed using the third set of instructions 414-2.

At block 506, the first lineage is compared with the second lineage of the second analytics application to determine a similarity between the first lineage and the second lineage. The comparison may be performed by the distributed data access system 114, such as using the first set of instructions 116.

At block 508, it is determined whether the first insight is usable in the processing of the second data based on the similarity. For example, if the first lineage is similar to the second lineage, it may be determined that the first insight can be used in the processing by the second analytics application. The determination may be performed by the distributed data access system 114.

In an example, in addition to the first lineage and the first insight, other lineages and insights may be also stored in the distributed data access system. The other lineages and insights may be generated, for example, by other analytics applications, such as the third analytics application 301, running in other containers, such as the third container 302.

The first lineage and the other lineages may be collectively referred to as a plurality of lineages. Also, the first insight and the other insights may be collectively referred to as a plurality of insights. Further, the first analytics application and the other analytics application may be collectively referred to as a plurality of analytics applications. Still further, the plurality of lineages and the plurality of insights may be collectively referred to as processed data.

In an example, the first computing node, in which the first container is deployed, may be part of a first cluster of computing nodes, such as the first analytics cluster 305. Further, each analytics application of the plurality of analytics applications may be running in a container deployed in the first cluster of computing nodes. In such a case, the plurality of lineages may be written to a first lineage PV associated with the first cluster of computing nodes. The first lineage PV may be, for example, the first lineage PV 410, and may be carved from a first distributed storage system that is associated with the first cluster of computing nodes. The first distributed storage system may be the first distributed storage system 307.

To ensure consistency among the plurality of lineages stored in the first lineage PV, the method 500 may include serializing writes to the first lineage PV. The serialization of the writes may be performed, for example, using the third set of instructions 414-1. In an example, serialization may be performed for lineages generated by analytics applications of the same type alone, i.e., analytics applications that process data of the same type. For example, the plurality of analytics applications may include a first plurality of analytics applications that are of the same type. In such a case, the writes of a first plurality of lineages, generated by the first plurality of analytics applications, alone may be serialized.

In an example, the insights generated by each analytics application of the plurality of analytics applications is stored in an insight PV specific to the analytics application. For example, as explained earlier, the insights generated by the first analytics application 102 may be stored in the first insight PV 209.

In some cases, the second computing node, in which the second container is deployed, may be in a second analytics cluster that is different from the analytics cluster in which the first computing node is present. For example, the second computing node may be deployed in the second analytics cluster 306. In such cases, a part of the processed data may be shared with a second distributed storage system associated with the second analytics cluster. The second distributed storage system may be, for example, the second distributed storage system 308.

In an example, the part of the processed data shared may be selected from incremental updates to the processed data since a previous instance at which the processed data was shared with the second analytics cluster. From the incremental updates, a portion may be determined as the data to be shared. The portion may be determined based on the processed data previously shared by the first analytics cluster that was used by the containers in the second analytics cluster, as explained earlier.

In an example, the first container may be proactively deployed in the first computing node in response to ingestion of raw data including the first data in the distributed storage system, before a container orchestrator deploys a second container for processing the raw data. This will be explained with reference to FIG. 6.

FIG. 6 illustrates a method 600 for proactively deploying a container to process the first data, according to an example implementation of the present subject matter. The method 600 may be performed using the first set of instructions 116 deployed in the distributed data access system 114.

At block 602, a type of the first data is determined. The type of the first data may be determined based on a location in the distributed storage system where the first data gets ingested, as explained earlier.

At block 604, processing to be performed on the first data is determined based on a processing performed on earlier data having a same type as the first data. For example, when the first data is determined to be an image, it may be determined that the first data is to be subjected to deep learning because earlier images were also subjected to deep learning.

Then, at block 606, an earlier container in which the earlier data was processed may be determined.

Subsequently, at block 608, the earlier container may be cloned to obtain the first container 106.

Figure 7:
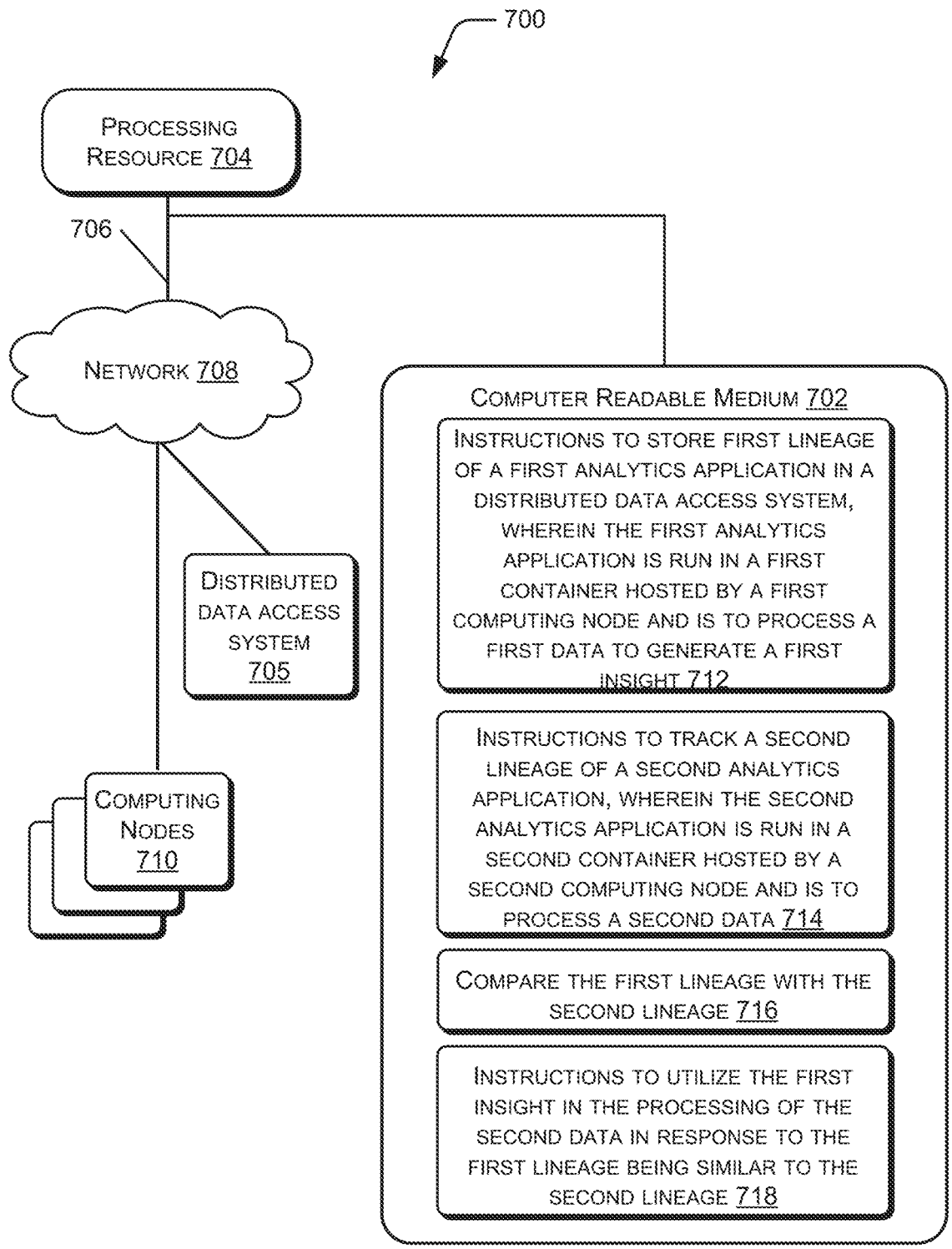
FIG. 7 illustrates a computing environment, implementing a non-transitory computer-readable medium for utilizing insights from one container in another container, according to an example implementation of the present subject matter.

FIG. 7 illustrates a computing environment 700, implementing a non-transitory computer-readable medium 702 for utilizing insights from one container hosted in one computing node in another container hosted in another computing node, according to an example implementation of the present subject matter.

In an example, the non-transitory computer-readable medium 702 may be utilized by a system, such as the system 100. The system 100 may be implemented in a public networking environment or a private networking environment. In an example, the computing environment 700 may include a processing resource 704 communicatively coupled to the non-transitory computer-readable medium 702 through a communication link 706.

In an example, the processing resource 704 may be implemented in a system, such as the system 100. The processing resource 704 may include a plurality of processors, of which a first processor may be deployed in a first computing node, a second processor may be deployed in a second computing node, and a third processor may be deployed in a distributed data access system 705. The first computing node may be, for example, the first computing node 110, the second computing node may be, for example, the second computing node 112, and the distributed data access system 705 may be, for example, the distributed data access system 114.

The non-transitory computer-readable medium 702 may be, for example, an internal memory device or an external memory device. In one implementation, the communication link 706 may be a direct communication link, such as any memory read/write interface. In another implementation, the communication link 706 may be an indirect communication link, such as a network interface. In such a case, the processing resource 704 may access the non-transitory computer-readable medium 702 through a network 708. The network 708 may be a single network or a combination of multiple networks and may use a variety of different communication protocols.

The processing resource 704 and the non-transitory computer-readable medium 702 may also be communicatively coupled to computing nodes 710 and the distributed data access system 705 over the network 708. The computing nodes 710 may include the first computing node and the second computing node.

In an example implementation, the non-transitory computer-readable medium 702 includes a set of computer-readable instructions to utilize insights from one container hosted in one computing node in another container hosted in another computing node. The set of computer-readable instructions can be accessed by the processing resource 704 through the communication link 706 and subsequently executed to perform acts to utilize insights from one container in another container.

Referring to FIG. 7, in an example, the non-transitory computer-readable medium 702 includes instructions 712 that cause the processing resource 704 to store first lineage of a first analytics application in the distributed data access system 705. The first analytics application is run in a first container hosted by a first computing system and is to process a first data to generate a first insight. The first analytics application may be the first analytics application 102. Accordingly, the first lineage and the first insight may be the first lineage 204 and the first insight 206, respectively, and the first container may be the first container 106.

The non-transitory computer-readable medium 702 includes instructions 714 that cause the processing resource 704 to track a second lineage of a second analytics application. The second analytics application is run in a second container hosted by a second computing node and is to process second data. The second analytics application may be the second analytics application 104 and the second container may be the second container 108.

The non-transitory computer-readable medium 702 includes instructions 716 that cause the processing resource 704 to compare the first lineage with the second lineage.

Based on the comparison, if the first lineage is determined to be similar to the second lineage, instructions 718 cause the processing resource 704 to utilize the first insight in the processing of the second data.

The present subject matter provides techniques to increase speed of processing of data by containerized analytics applications. For instance, usage of already-generated insights in the processing by an analytics application significantly reduces the time consumed for the processing. Also, making insights and lineages available for several containers deployed in a different computing node improves overall effectiveness of analytics applications running in containerized environments. Further, proactively deploying containers in response to ingestion of raw data enables quicker completion of processing by the subsequently-deployed container. Still further, proactively deploying the container near a site of ingestion of the raw data prevents movement of the raw data across a data fabric, thereby reducing data transfer costs. Instead of the raw data, insights and lineages, which are of much smaller size than the raw data, alone are transferred across the data fabric. This allows deployment of containers in any analytics cluster regardless of the site of ingestion of data, while also satisfying principle of data gravity. Further, providing a higher priority to the transfer of insights and lineages ensures that the insights are quickly available for reuse across analytics clusters.

Overall, the present subject matter facilitates seamless mobility of data and analytics applications across computing nodes across analytics clusters with minimal expenditure of computational and network resources. Since containers may be dynamically moved from one computing node to another computing node, and may be dynamically deployed in any analytics cluster of a plurality of analytics clusters, the ability to reuse insights in containers across computing nodes, even if they are distributed across analytics clusters, optimizes the overall containerized analytics environment.

Although implementations of insight usage across computing nodes running containerized analytics have been described in language specific to structural features and/or methods, it is to be understood that the present subject matter is not necessarily limited to the specific features or methods described. Rather, the specific features and methods are disclosed and explained as example implementations.

We claim:

1. A system comprising:
    a first computing node to host a first container having a first analytics application running thereon, the first analytics application to process first data to generate a first insight;
    a second computing node to host a second container having a second analytics application running thereon, the second analytics application to process second data; and
    a distributed data access system that includes:
        a lineage persistent volume (PV) to store a first lineage and a second lineage, wherein the first lineage is of the first analytics application and comprises information of the first data and workflow used to generate the first insight, and wherein the second lineage is of the second analytics application,
        a first insight PV to store the first insight, and
        a first set of processor-executable instructions to:
            receive the first lineage,
            receive the second lineage,
            compare the first lineage and the second lineage to determine whether the first insight is usable in the processing of the second data, and
            mount the first insight PV on the second container in response to a determination that the first insight is usable in the processing of the second data.

2. The system of claim 1, wherein
    the second container is a second instance of the first container,
    the first container is disrupted in the first computing node before completion of processing of the first data,
    the second container is hosted in the second computing node in response to the first container being disrupted in the first computing node, and
    the second analytics application is to utilize the first insight to complete a remainder of the processing of the first data.

3. The system of claim 1, wherein, on ingestion of the first data in the distributed data access system, the first set of processor-executable instructions comprises instructions to:
    identify a type of the first data;
    determine processing to be performed on the first data based on a processing performed on earlier data having a same type as the first data; and
    proactively deploy the first container to process the first data based on the determined processing to be performed on the first data.

4. The system of claim 3, wherein, to deploy the first container, the first set of processor-executable instructions comprises instructions to:
    determine an earlier container in which the earlier data was processed; and
    clone the earlier container to obtain the first container.

5. The system of claim 3, wherein
    the first computing node is part of a first cluster of computing nodes,
    the second computing node is part of a second cluster of computing nodes,
    the distributed data access system comprises a first distributed storage system associated with the first cluster of computing nodes, and
    the first set of processor-executable instructions comprises instructions to proactively deploy the first container in the first computing node in response to the first data being ingested in the first distributed storage system.

6. The system of claim 1, wherein
the first computing node is part of a first cluster of computing nodes,
the second computing node is part of a second cluster of computing nodes,
the distributed data access system is a data fabric comprising a first distributed storage system associated with the first cluster of computing nodes and a second distributed storage system associated with the second cluster of computing nodes, and
the data fabric comprises a second set of processor-executable instructions to share the first lineage and the first insight across the data fabric.

7. The system of claim 6, wherein,
in addition to the first lineage and the first insight, the second set of processor-executable instructions comprises instructions to share unprocessed data across the data fabric, and
the second set of processor-executable instructions comprises instructions to share the first insight and the first lineage with a higher priority as compared to the unprocessed data.

8. A method comprising:
tracking a first lineage of a first analytics application, wherein the first analytics application is run in a first container hosted by a first computing node that is part of a first cluster of computing nodes, and the first analytics application processes first data to generate a first insight, the first lineage comprising information of the first data and a workflow used to obtain the first insight;
tracking a second lineage of a second analytics application, the second analytics application running in a second container hosted by a second computing node that is part of a second cluster of computing nodes, and the second analytics application is to process second data;
comparing the first lineage with the second lineage to determine a similarity between the first lineage and the second lineage;
determining whether the first insight is usable in the processing of the second data based on the similarity
storing, in a first lineage persistent volume (PV), a plurality of lineages of a plurality of analytics applications running in containers deployed in the first cluster of computing nodes, the first lineage PV being part of a first distributed storage system associated with the first cluster of computing nodes, and the plurality of lineages and a plurality of insights generated by the plurality of analytics applications together form processed data;
storing insights generated by each analytics application of the plurality of analytics applications in an insight PV specific to the analytics application;
sharing a part of the processed data with a second distributed storage system associated with the second cluster of computing nodes for use in the second cluster of computing nodes; and
determining the part of the processed data from incremental updates to the processed data since a previous sharing of the processed data.

9. The method of claim 8, comprising:
identifying a type of the first data;
determining a processing to be performed on the first data based on a processing performed on earlier data having a same type as the first data; and
proactively deploying the first container to process the first data based on the determined processing to be performed on the first data.

10. The method of claim 9, to deploy the first container, the method comprises:
determining an earlier container in which the earlier data was processed; and
cloning the earlier container to obtain the first container.

11. The method of claim 8, wherein
the plurality of analytics applications comprises a first plurality of analytics applications that are of a same type,
the first plurality of analytics applications together generates a first plurality of lineages, and
the method comprises serializing writes of the first plurality of lineages to the first lineage PV to ensure consistency among the first plurality of lineages.

12. The method of claim 8, comprising determining a portion of the incremental updates to be the part of the processed data based on usage, by the second cluster of computing nodes, of previously-shared processed data.

13. A non-transitory computer-readable medium comprising instructions, the instructions being executable by a processing resource to:
store a first lineage of a first analytics application in a distributed data access system, wherein the first analytics application is run in a first container hosted by a first computing node that is part of a first cluster of computing nodes, and the first analytics application is to process a first data to generate a first insight, and wherein the distributed data access system is a data fabric comprising a first distributed storage system associated with the first cluster of computing nodes and a second distributed storage system associated with a second cluster of computing nodes;
track a second lineage of a second analytics application, wherein the second analytics application is run in a second container hosted by a second computing node that is part of the second cluster of computing nodes, and the second analytics application is to process a second data;
compare the first lineage with the second lineage;
in response to the first lineage being similar to the second lineage, utilize the first insight in the processing of the second data; and
share the first lineage and the first insight across the data fabric with a higher priority as compared to an unprocessed data.

14. The non-transitory computer-readable medium of claim 13, wherein, in response to receiving the first data, the instructions are further executable by the processing resource to:
identify a type of the first data;
determine processing to be performed on the first data based on a processing performed on an earlier data having a same type as the first data; and
clone an earlier container in which the earlier data was processed to obtain the first container.

15. The non-transitory computer-readable medium of claim 14, wherein
the instructions are further executable by the processing resource to proactively deploy the first container in the first computing node in response to the first data getting ingested in the first distributed storage system.

* * * * *